No. 733,912. PATENTED JULY 14, 1903.
W. H. LEDBETTER.
SEED PLANTER.
APPLICATION FILED SEPT. 8, 1902.
NO MODEL. 4 SHEETS—SHEET 1.
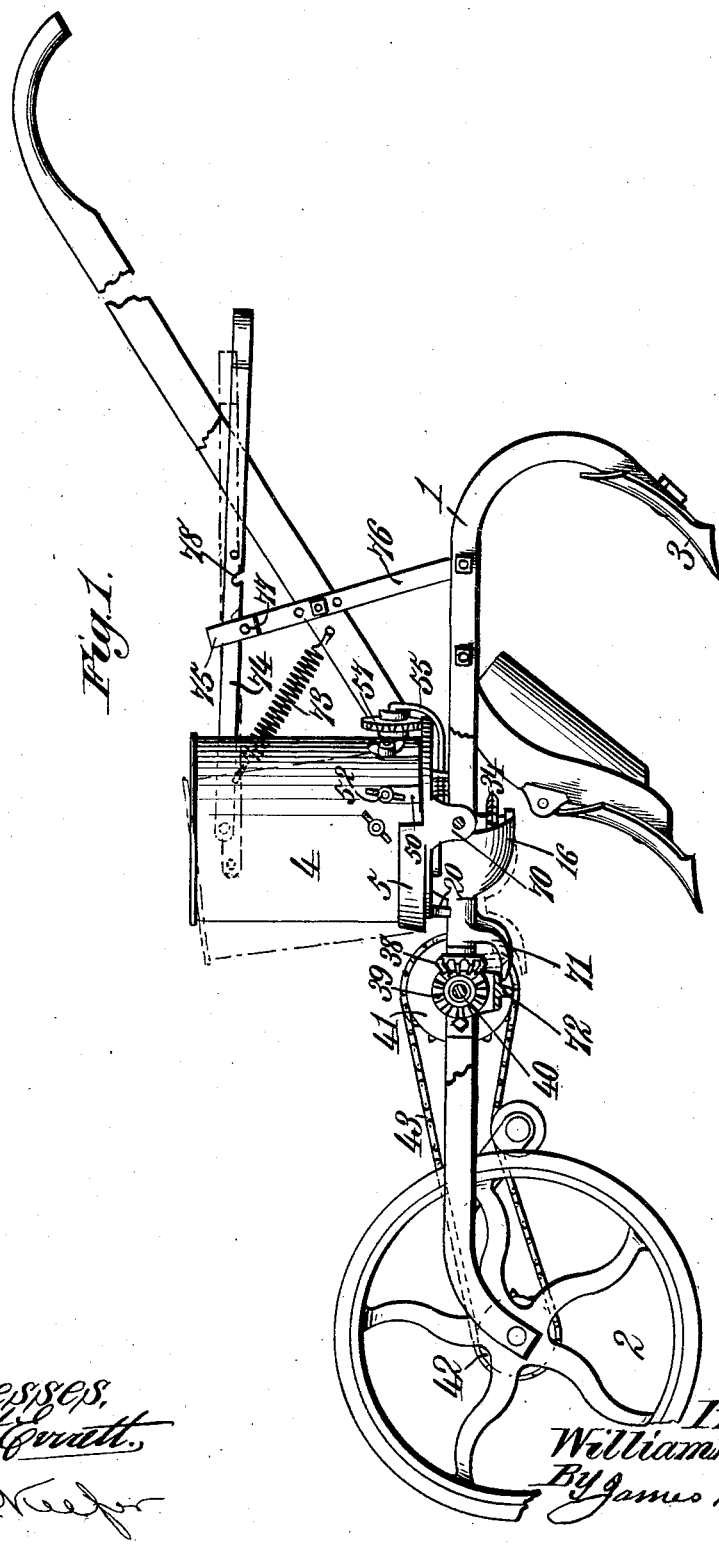
Witnesses
Inventor
William H. Ledbetter
By James L. Norris
Atty.

No. 733,912. PATENTED JULY 14, 1903.
W. H. LEDBETTER.
SEED PLANTER.
APPLICATION FILED SEPT. 8, 1902.
NO MODEL. 4 SHEETS—SHEET 2.
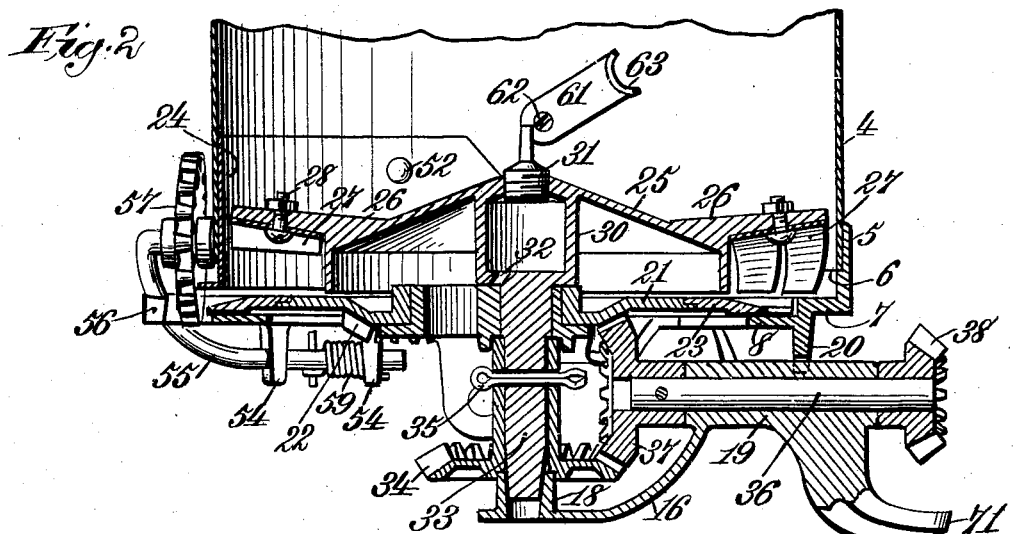
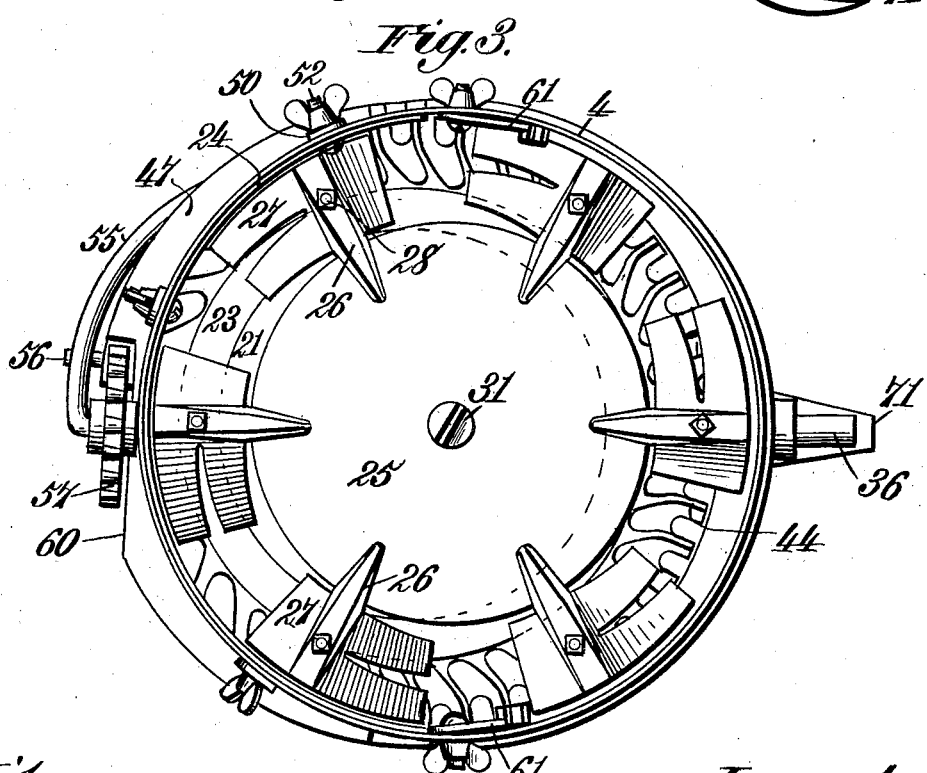
Witnesses.
Robert Everett,
Inventor.
William H. Ledbetter.
By James L. Norris.
Atty.

No. 733,912. PATENTED JULY 14, 1903.
W. H. LEDBETTER.
SEED PLANTER.
APPLICATION FILED SEPT. 8, 1902.
NO MODEL. 4 SHEETS—SHEET 3.
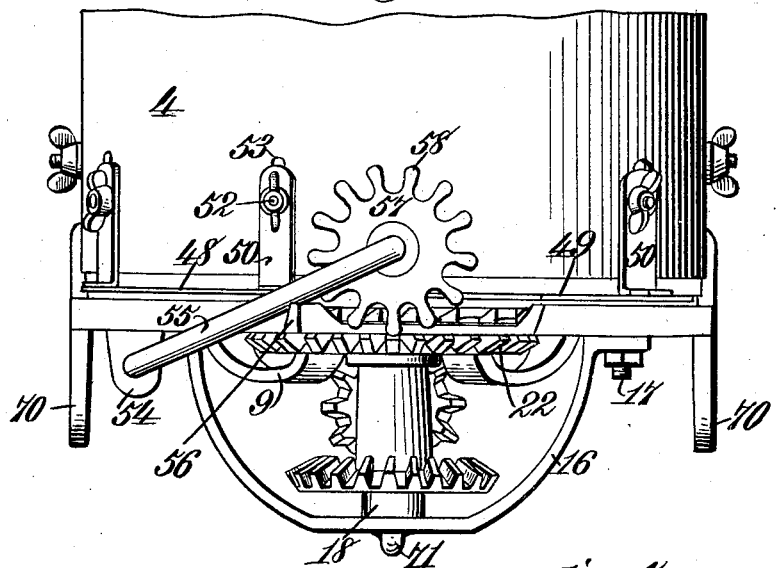
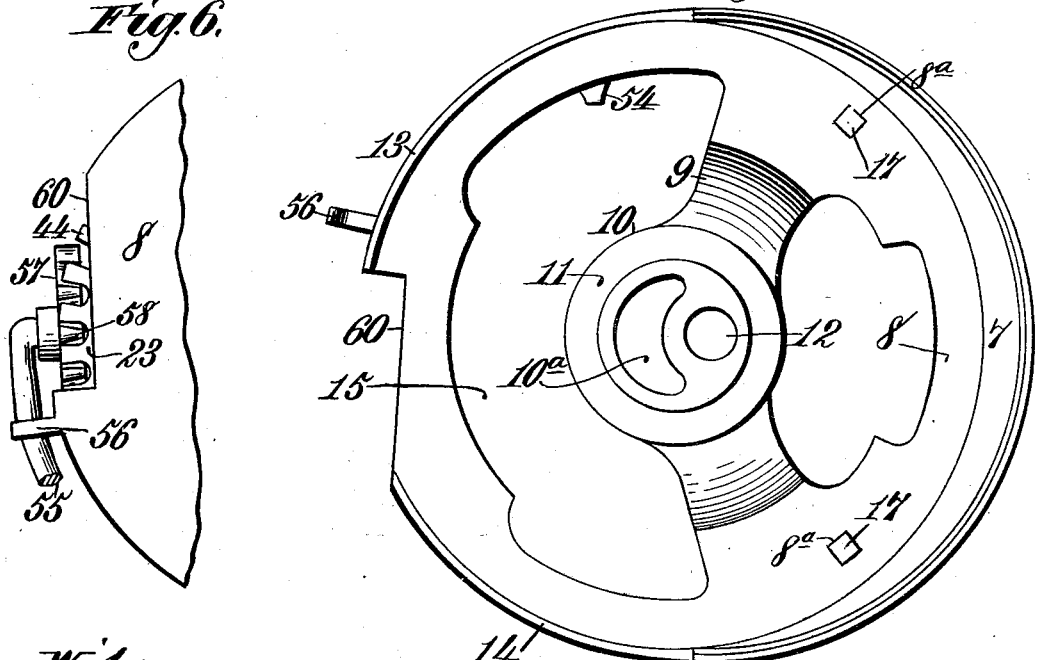
Witnesses
Inventor
William H. Ledbetter No. 733,912. PATENTED JULY 14, 1903.
W. H. LEDBETTER.
SEED PLANTER.
APPLICATION FILED SEPT. 8, 1902.
NO MODEL. 4 SHEETS—SHEET 4.
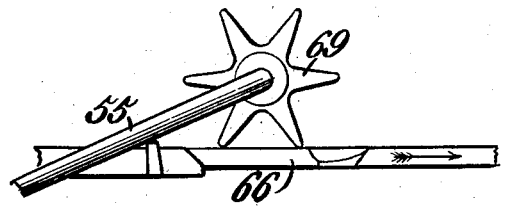
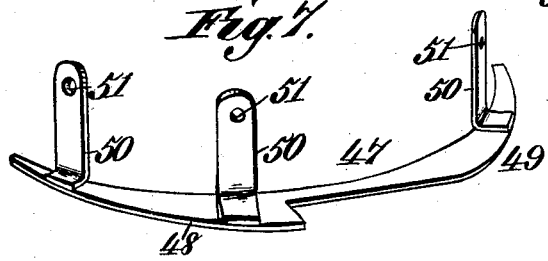
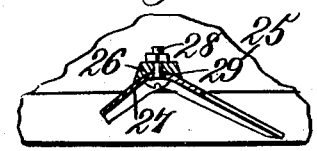
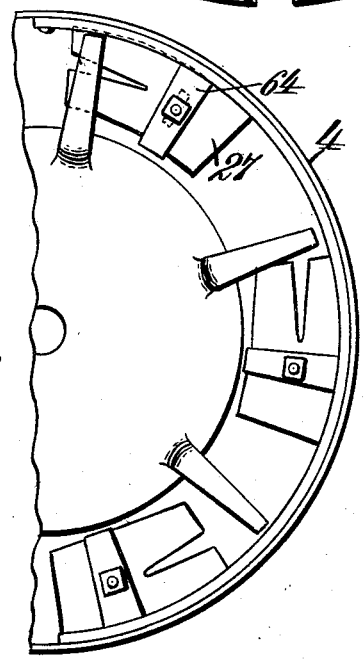
Witnesses,
Robert Everett.
Inventor,
William H. Ledbetter
By James L. Norris
Atty.
THE NORRIS PETERS CO., PHOTO-LITHO., WASHINGTON, D. C.

No. 733,912. Patented July 14, 1903.

UNITED STATES PATENT OFFICE.

WILLIAM H. LEDBETTER, OF DALLAS, TEXAS, ASSIGNOR TO THE ONE-SEED PLANTER CO., OF DALLAS, TEXAS, A CORPORATION OF TEXAS.

SEED-PLANTER.

SPECIFICATION forming part of Letters Patent No. 733,912, dated July 14, 1903.

Application filed September 8, 1902. Serial No. 122,574. (No model.)

*To all whom it may concern:*

Be it known that I, WILLIAM H. LEDBETTER, a citizen of the United States, residing at Dallas, in the county of Dallas and State of Texas, have invented new and useful Improvements in Seed-Planters, of which the following is a specification.

This invention relates to seed-planters, and is in the nature of an improvement upon the planter for which I obtained Letters Patent of the United States on the 18th day of February, 1902, No. 693,724; and it has for its object to provide improved means for lubricating the operative portions of the seed-dropping mechanism; to provide improved mechanism for automatically throwing into and out of operation the gearing that actuates the seed-dropping mechanism, whereby when the planter is moved rearwardly the seed-dropping mechanism will be thrown out of operation; to improve the configuration of the seed-slots in the seed-dropping ring, whereby but one seed will be dropped at a time; to provide means for preventing seed from escaping from the seed-dropping ring until they arrive at the point where it is desired to drop the same; to so construct the seed-ejector or spur-wheel that while its teeth are sufficiently large to completely fill the seed-slots and punch out the seed therefrom they will also withdraw or roll out of said seed-slots without friction and without liability of riding on the ring.

The invention also has for its purpose to improve and simplify the operative mechanism of this class of machines generally.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a view in side elevation, partially in section, of my seed-planter, showing the gear-shifting mechanism. Fig. 2 is a vertical longitudinal sectional view of the lower portion of the hopper and of the seed-dropping mechanism. Fig. 3 is a top plan view thereof. Fig. 4 is a rear elevation of the hopper and dropping mechanism. Fig. 5 is a plan view of the base of the hopper. Fig. 6 is a detail bottom view illustrating the operation of the ejector or spur-wheel and illustrating the taper or beveled formation of the teeth of said wheel. Fig. 7 is a detail perspective view of a cover-plate. Fig. 8 is a detail view illustrating one of the sweeps or spring-blades and the means for supporting it in position on the stirrer-disk. Fig. 9 is a detail perspective view of one of the sweeps or spring-blades and showing a modified form of one of the grooved arms that supports the sweep or blade. Fig. 10 is a detail perspective view of a portion of the cotton-seed-dropping ring. Fig. 11 is a top plan view of a portion of the corn-dropping ring. Fig. 12 is a top plan view illustrating a modified arrangement of the sweeps or spring-blades. Fig. 13 is a detail view of the corn-ejector or spur-wheel employed in connection with the dropping-ring shown in Fig. 11, and Fig. 14 is a detail view illustrating the manner in which the seed-stirrer arms rotate above the fixed spring blades or sweeps and the arms which support the latter.

Referring to the drawings, the numeral 1 indicates the frame of the machine, which may be of any approved or preferred construction, said frame having journaled in its forward end a ground-wheel 2 and is provided at its rear end with covering-shovels 3, all constructed in the usual manner. Supported upon said frame is a hopper 4, which preferably consists of a vertical cylindrical drum, which may be conveniently formed of sheet metal and is rigidly fastened at its forward lower end to a semicircular vertical rim 5, which is shouldered on its inner side, as at 6, to form a seat for the hopper to rest upon, said rim 5 being formed around the outer edge of a crescent-shaped flange 7, which in turn is formed around the forward half of the annular base 8. A cross-bar or bridge 9 is formed across the base 8 and integrally therewith. A boss 10 rises vertically from the center of the bridge 9, and formed around the lower end of said boss is a track 11. A vertical bearing 12 is formed in the forward portion of the boss, while a substantially crescent-shaped opening $10^a$ is formed in the rear portion of the boss to reduce the weight and save metal. Vertical segmental flanges 13 and 14 extend from the extremities of the crescent-shaped flange 7 around the rear edge of the base 8 to a segmental recess or cut-away portion 15, formed in the rear edge portion of the base, said flanges 13 and 14 being approximately only about one-fourth of an inch above the base, as shown in Fig. 4. The boss 10 and track 11 are located exactly in the center of the circular base 8, while the bearing 12 is formed eccentrically in the base—that is to say, is formed forward of the center of the boss, as shown in Fig. 5.

A semicup-shaped casing or housing 16 is bolted under the forward portion of the base 8 by bolts 17, (see Figs. 4 and 5,) that pass down through countersunk holes 8ª in an annular portion of the base 8. The casing 16 has a step-bearing 18 formed in its bottom, which is centrally located under the bearing 12, formed in the boss 10. A forwardly and horizontally extending journal-box or sleeve 19 is formed integrally with the casing and fits against the curved under side of a depending lug 20, formed on the under side of the base 8 forward of the center of the latter.

Journaled about the boss 10 and rotatively resting on the track 11 is a gear-disk 21, the gear-teeth 22 of which are formed on its under side. Loosely and removably fitted around the gear-disk 21 is a seed-dropping ring 23, the edges of the gear-disk and said ring being rabbeted together, so that the gear-disk will support the weight of the dropping-ring, one of said parts being provided with lugs and the other with corresponding recesses, the lugs fitting in said recesses, so as to cause the seed-dropping ring and gear-disk to rotate together, the ring moving in close proximity to the upper smooth side or face of the ring portion of the base 8. As before stated, the hopper 4, being fastened to the rim or flange 5, which rises vertically from the outer edge of the crescent-shaped flange 7, the said hopper is forwardly eccentric to the center of the boss 10 and to the rear edge of the base 8, but is concentric with the bearing 12 in said boss. It will therefore be seen that the dropping-ring is rearwardly eccentric from the center of the hopper and projects beyond the rear edge of the latter and extends out from under the rear portion of the hopper a distance corresponding to the width of the crescent-shaped flange 7. The distance between the center of the boss 10 and the center of the bearing 12 also corresponds to the width of the crescent-shaped flange 7, and it will therefore be obvious that the rear edge of the hopper is disposed above the rear portion of the dropping-ring, the distance between the rear bottom edge of the hopper and the top of the dropping-ring being equal to the distance between the shoulder 6 of the flange 5 and the top of the crescent-shaped flange 7, as shown in Fig. 2, the space thus formed being for the convenience of removing and replacing the dropping-rings. The space between the rear edge of the hopper and the upper side of the dropping-ring is closed by a cut-off gate 24, consisting of a segmental piece of sheet metal, which is adjustably secured to the inner rear side of the hopper in the manner hereinafter described. Disposed in the bottom of the hopper and free of said dropping-ring 23 is a conical stirrer-disk 25, from the periphery of the upper side of which extends radial arms 26, grooved longitudinally on their under side for the reception of sweeps or spring-blades 27, which are drawn up into the grooved portions of said arms by bolts 28, (preferably T-headed,) which pass through holes 29, formed in the said blades and grooved arms. The blades or sweeps 27 are preferably slitted one or more times from their rear or free ends up to a point near the arms 26 and are extended at their front ends forwardly and downwardly to form cut-offs or skimmers, which operate to prevent too many seed from passing under their forward ends and crowding the spring or free ends of the blades 27. The spring-blades 27 preferably taper from the arms 26 toward their free ends, as most clearly shown in Figs. 3, 8, and 9.

Formed centrally on the under side of the conical disk 25 is a hollow hub 30, which forms an oil-cup adapted to contain oil for lubricating the inner rotary frictional parts of the dropping mechanism. The oil-cup 30 is provided at its top with a filling-orifice which is adapted to be closed by a plug 31 and is provided at its bottom with a perforation 32, forming an outlet for the oil. From the bottom of the hub 30 depends a stem or shaft 33, preferably cast integral therewith and which extends down through the bearing 12 and rests at its bottom in the step-bearing 18, as shown in Fig. 2. The hub or oil-cup 30 is of such diameter as to overlap the gear-disk 21, so as to hold the latter down in place.

A sleeve-gear 34 is loosely arranged around the stem or shaft 33 and is fastened thereto by a cotter-pin 35. A drive-shaft 36 is journaled in the sleeve or journal-box 19, and fixed upon the inner or rear end of said shaft is a relatively small driving-gear 37, which gears with the sleeve-gear 34 beneath it and with a gear 22 formed on the bottom of the gear-disk and above the driving-gear 37, and while the gear on the gear-disk is larger than the sleeve-gear, yet because of their eccentrical arrangement, before described, their forward edges are directly in line with the driving-gear 37, which latter gears with both of said gears, as shown in Figs. 3 and 4. Fixed upon the outer end of the driving-shaft 36 is a beveled gear 38, which normally gears with a similar gear 39, (see Fig. 1,) which is fixed on the shaft 40, journaled transversely in the frame of the machine directly in front of the hopper. Fixed upon one end of the shaft 40 is a sprocket-wheel 41, and fixed upon the shaft of the ground or driving wheel is a small sprocket-wheel 42, said sprockets being geared together by a sprocket-chain 43. By interchanging the sprockets 41 and 42 the speed of rotation of the seed-dropping ring may be differentiated.

From the foregoing description it will be evident that as the planter is drawn forward the wheel 2 through the medium of the gearing described will rotate the gear-disk and seed-dropping ring in one direction, and the sleeve-gear and the conical stirrer with its sweeps or spring-blades in the opposite direction, the blades serving to sweep over the seed to press or feed them into the seed-slots formed in the periphery of the seed-dropping ring 23, which is adapted for planting cotton-seed only. Formed on the periphery of the seed-dropping ring 23 are radially-projecting teeth 44, (see Fig. 10,) each of which is provided with a vertical side 44ª, its opposite side being formed vertical for a portion of its vertical width only and is from thence beveled or formed at an inclination, as indicated at 45. Formed in the upper side of the seed-dropping ring and extending rearwardly from the slots are grooves 46, which gradually diminish in depth from their outer toward their inner end. By the term "rearwardly" I wish it to be understood that said grooves extend angularly in a direction reverse to that in which the seed-dropping ring rotates, whereby a convenient passage is afforded for the escape back into the hopper of any seed crowded on top of a seed about to be dropped.

Fastened to the lower rear side of the hopper and projecting laterally over the projecting portion of the seed-dropping ring is a cover-plate 47, comprising two segment-shaped portions 48 and 49, preferably formed of sheet metal and provided with upwardly-projecting metal straps 50, perforated at their upper ends, as at 51, and through said perforations are passed bolts 52. On the inner rear side of the hopper is arranged a cut-off gate 24, as before described, which cut-off gate is adapted to be secured in place by the same bolts 52 that operate to hold the cover-plate in place. The bolts 52 pass through slots 53 in the hopper, whereby the cut-off gate and cover-plate may be vertically adjusted to remove or replace the dropping-rings and to accommodate dropping-rings of different thicknesses.

Formed on the bottom of the hopper-base 8 are two lugs 54, in which is journaled one end of an arm 55, the other end of which rests on the stop-lug 56, formed on the rear portion of the base 8. On the free end of said arm is rotatively mounted a seed-ejector or spur-wheel 57, comprising a circular disk (see Figs. 4 and 6) having formed on its periphery a series of radially-projecting teeth, the outer ends 58 of which are large enough to fill the seed-slots, but which are contracted or gradually diminish toward their juncture with said wheel. The teeth also taper from their outer toward their inner faces or sides in the same manner as the teeth of a beveled gear and as shown in Fig. 6.

Fixed upon the journaled end of the arm 55 is a coiled spring 59, which operates to press or force the free end, or that end which carries the ejector or spur-wheel, downwardly into engagement with the seed-slots in the seed-dropping ring, the spur-wheel being kept from riding upon the periphery of the dropping-ring by the stop-lug before referred to, and owing to the formation of the teeth of the spur-wheel and to the fact that the projecting of the teeth into the seed-slots is gaged by the stop-lug the seed are ejected from the slot and the teeth are permitted to escape from the slots without having frictional contact with the teeth of the seed-dropping ring. In other words, the ends of the teeth of the spur-wheel are large enough to occupy the entire space between the teeth of the seed-dropping ring, and after each tooth of the spur-wheel has operated to eject the seed from the seed-slots it will be moved freely from out the slots for the reasons immediately above stated and for the further reason that the teeth are contracted toward their inner ends. This operation is also facilitated owing to the fact that the teeth are thinner on their inner than on their outer sides. The free end of the arm 55 is bent at approximately a right angle, so as to lie in a plane disposed slightly to one side of the center of the hopper, so that the teeth on the spur-wheel journaled on such bent end can squarely enter and fill the slots, as shown in Fig. 6. The rear outer edge of the base 8 is recessed or cut away, as indicated at 15, forming a straight edge 60, that lies at an angle to the radius of the bottom of the hopper, whereby as the seed-dropping ring rotates across said cut-away portion the latter operates to thrust the seed outwardly that might hang or swing onto the seed-dropping ring. In other words, said straight edge has a tendency to tear loose and thrust outwardly any seed that may hang on or cling to the seed-dropping ring after they have been punched out by the spur-wheel 57. After the dropping-ring emerges from the lower rear edge of the hopper and from under the cut-off gate 24 the seed are held in place by the part 48 of the cover-plate; otherwise they might be blown out by the wind, and should any of the seed escape or pass both the spur-wheel 57 and the straight edge 60 the other end 49 of the cover-plate will insure their reëntry into the hopper without cracking the seed. Said cover-plate may be made in sections, if preferred.

Referring again to the sweeper or spring-blades 27, they are slitted at their free ends, as before stated, so that if seed or foreign substances should get caught under one side of the blade the other side will be free to press the seed down into the seed-slots, for it is obvious that while at one point of the rotation of the stirrer-disk, owing to the eccentric arrangement of the parts before described, one side of the spring-blades will be directly over the seed-slots and at another point of their rotation will be over the level plane of the crescent-shaped portion 7 of the bottom of the hoppr or the inner smooth surface of the ring at the rear of the hopper.

Instead of rotating the stirrer-disk to cause the sweeps or spring-blades to sweep over the periphery of the seed-dropping ring, said disk may be locked stationary by means of arms 61, which are attached to the inner sides of the hopper by means of bolts 62. When it is desired to hold the stirrer-disk stationary, the bolts 62 should be first loosened, after which the free ends of the arms 61, which are provided with saddles 63, are caused to engage two of the stirrer-arms 26, after which the bolts 62 are tightened up, thus holding the stirrer-disk against movement. After this has been done the cotter-pin 35 is withdrawn or removed, thereby permitting the sleeve-gear 34 to ride idly about the shaft 33 without communicating any rotary motion to the latter, or instead of attaching the sweepers or spring-blades to the stirrer-arms 26 they may be bolted to similar arms 64, (see Fig. 9,) having vertical extensions 65, which latter in turn are bolted directly to the interior of the lower portion of the hopper, or said arms 65 may be formed integrally with a segment-shaped rim, which may be bolted to the lower interior portion of the hopper, as shown in Fig. 12. In such instance the arms of the stirrer are formed as shown in Fig. 14 and will sweep over and clear the stationary blades, stirring the seed, so that the seed-slots will pull or drag the seed under the blades, and the latter will press the seed into the slots.

When it is desired to use the planter for planting corn, I substitute for the cotton-seed-dropping ring before described the corn-dropping ring 66, (see Fig. 11,) in which the seed-slots 67, formed in the periphery of said ring, are arranged farther apart than the cotton-seed slots hereinbefore referred to. Each of the slots 67 is preferably arranged lengthwise in the direction in which the seed-ring rotates instead of being arranged radially, as are the cotton-seed slots, and each of the slots 67 is in practice made of a size and shape to receive a grain of corn. Formed in the upper side of the seed-ring 66 and extending at an angle rearwardly from the slots 67 are wide diminishing grooves 68, which will readily permit the escape back into the hopper of any grains of corn that should lie on top of the grains disposed in the bottom of the seed-slots 67. The wall of each of the slots 67 is made vertical until it meets the diminishing groove 68, whereby one grain of corn will be carried around in each slot by the ring 66 with certainty. When the corn-dropping ring 66 is substituted for the cotton-seed-dropping ring, the ejector or spur-wheel 57, before referred to, is removed from the end of the arm 55 and the corn spur-wheel 69 (see Fig. 13) is substituted. The teeth of the spur-wheel 69 will slide idly over the solid portions of the seed-dropping ring 66 until one of the seed-slots is brought beneath one of the teeth of the spur-wheel, when the spring-pressed arm 55 will force the tooth of the spur-wheel into the seed-slot and push out the seed therefrom, after which as the seed-ring continues to rotate said tooth will be withdrawn from the seed-slot.

In my said former patent, hereinbefore referred to, I show the gears 22, 34, and 37 as being inclosed in a cup-shaped housing. In the present instance I dispense with the rear portion of said housing, as most clearly shown in Figs. 1, 2, and 4, whereby water, dust, and the like that might otherwise accumulate in the housing may be permitted to escape.

Formed on diametrically opposite sides of the base of the hopper are two depending lugs 70, which are pivoted to the sides of the frame 1, whereby the hopper and base are capable of tilting and oscillating forwardly and rearwardly. The gear-wheel 38 on the forward end of the shaft 36 is normally engaged by the gear-wheel 39, driven from the ground-wheel 2, and is held from moving upwardly out of engagement with the gear-wheel 39 by any suitable stop; but for convenience I show a downwardly and forwardly curved horn 71, which is formed on the sleeve 19 and engages at its forward end the under side of a cross-bar 72, attached transversely to the frame of the machine beneath the shaft 40. To the upper side of the hopper is attached one end of a coiled spring 73, the other end of which is attached to any fixed part of the frame of the machine—as, for example, to one of the handles. The spring 73 operates to tilt the hopper rearwardly in such manner as to normally hold the gear-wheel 38 in engagement with the gear-wheel 39, and owing to the direction in which the gear-wheel 39 moves when the machine is being drawn forward said gear-wheels are held in engagement with each other, so as to rotate the seed-dropping and stirrer mechanism. Should the planter be moved rearwardly, however, the direction of rotation of the gear-wheel 39 is reversed, and will thus operate upon the teeth of the gear-wheel 38 in such manner as to throw the latter downwardly out of engagement with the gear-wheel 39, thereby tilting the hopper forward and throwing said gearing out of operation, whereby the seed-dropping and stirrer mechanism will be rendered inoperative until the planter is again moved forward. Pivoted to one side of the hopper is one end of a lever 74, which projects rearwardly and passes through the looped end 75 of a metal strap 76, which is attached to the frame of the machine and to one of the handles. A rack-pin 77 passes transversely through the looped end of the strap 76, and the lower edge of the lever 74 rests thereupon. By means of the lever 74 the hopper may be tilted forward by hand to throw the gears 38 and 39 out of engagement with each other, and the parts may be locked in this position by means of the pin 77, entering a recess 78, formed in the under side of said lever. This arrangement is desirable when the machine is to be moved from one point to another without planting seed.

Having described my invention, what I claim is—

1. In a seed-planter, the combination with a hopper and a base therefor, of a rotary seed-dropping ring mounted in the bottom of the hopper and provided on its periphery with seed-slots, one side of each slot being vertical and the opposite side being vertical for a portion of its height and beveled or inclined for the remainder of its height, substantially as described.

2. In a seed-planter, the combination with a hopper and a base therefor, of a rotary seed-dropping ring mounted in the bottom of the hopper and provided on its periphery with seed-slots, the upper side of the seed-dropping ring being provided with diminishing grooves which extend rearwardly at an angle from the seed-slots, substantially as described.

3. In a seed-planter, the combination with a hopper and a base therefor, of a rotary seed-dropping ring mounted in the bottom of the hopper and provided near its outer edge with seed-slots which extend through the periphery of said ring, the upper side of the ring having formed therein wide diminishing grooves which extend rearwardly from the slots at angles to radii of the seed-dropping ring, substantially as described.

4. In a seed-planter, the combination with a hopper and a base therefor, of a rotary seed-dropping ring eccentrically mounted in the bottom of the hopper and provided on its periphery with seed-slots, said seed-dropping ring projecting beyond the lower rear edge of the hopper, means for ejecting the seed from the seed-slots, and a cover-plate arranged over the rearwardly-projecting portion of the seed-dropping ring, substantially as described.

5. In a seed-planter, the combination with a hopper and a base therefor, of a rotary seed-dropping ring eccentrically mounted in the bottom of the hopper and provided on its periphery with seed-slots, said seed-dropping ring projecting beyond the lower rear edge of the hopper, means for ejecting the seed from the seed-slots, and an approximately crescent-shaped cover attached to the lower rear edge of the hopper and covering the seed-dropping ring as the latter travels outside of the hopper, substantially as described.

6. In a seed-planter, the combination with a hopper and a base therefor, of a rotary seed-dropping ring eccentrically mounted in the bottom of the hopper and provided on its periphery with seed-slots, the said base being cut away at its rear edge on a straight line disposed at a slight angle to a radius of the seed-dropping ring, the periphery of the seed-dropping ring projecting beyond the lower rear edge of the hopper and beyond said cut-away portion of the base, substantially as described.

7. In a seed-planter, the combination with a hopper and a base therefor, of a rotary seed-dropping ring eccentrically mounted in the bottom of the hopper and provided on its periphery with seed-slots, the said base being cut away at its rear edge on a straight line disposed at a slight angle to a radius of the seed-dropping ring and flanged on each side of said cut-away portion, the periphery of the seed-dropping ring projecting beyond the lower rear edge of the hopper, beyond the said cut-away portion of the base, and in close proximity to said flanges, and an approximately crescent-shaped cover-plate arranged above the projecting portion of the seed-dropping ring, said cover-plate being cut away to correspond to the cut-away portion of the base, and resting on the upper edges of said flanges, substantially as described.

8. In a seed-planter, the combination with a hopper and a base therefor, of a rotary seed-dropping ring eccentrically mounted in the bottom of the hopper and provided on its periphery with seed-slots, said base being cut away at its rear edge on a straight line disposed at a slight angle to a radius of the seed-dropping ring, the periphery of the seed-dropping ring projecting beyond the lower rear edge of the hopper and beyond the said cut-away portion of the base, and an approximately crescent-shaped cover-plate arranged above the projecting portion of the seed-dropping ring, and adjustably attached to the hopper, said cover-plate being cut away to correspond to the cut-away portion of the base, substantially as described.

9. In a seed-planter, the combination with a cylindrical hopper and a circular base therefor, said base being provided with a crescent-shaped flange and a peripheral upwardly-projecting flange extending around the front portion of said base, said flange being provided on its inner side with a shoulder forming a seat on which the hopper rests, a vertically-adjustable gate arranged on the lower rear portion of the hopper operating to control the opening between the lower edge of the hopper and the seed-dropping ring said seed-dropping ring projecting through said opening and beyond the rear edge of the base, and means for ejecting the seed from the seed-dropping ring, substantially as described.

10. In a seed-planter, the combination with a hopper and a base therefor, of a rotary seed-dropping ring eccentrically mounted in the bottom of the hopper and provided on its periphery with seed-slots, said seed-dropping ring projecting beyond the lower rear edge of the hopper, a toothed wheel arranged to engage the seed-slots and punch the seed therefrom, said wheel being yieldingly supported at the rear edge of the hopper above the projecting portion of the seed-dropping ring, a spring for throwing said wheel into engagement with the seed-slots and a stop for limiting the downward movement of the wheel, substantially as described.

11. In a seed-planter, the combination with a hopper and a base therefor, of a rotary seed-dropping ring eccentrically mounted in the bottom of the hopper and provided on its periphery with seed-slots, said seed-dropping ring projecting beyond the lower rear edge of the hopper, a swinging arm journaled at one end in a fixed bearing, a toothed wheel rotatably mounted on the free end of said arm and arranged to engage the said slots in the seed-dropping ring to punch the seed therefrom, and a coiled spring arranged on the journaled end of said arm and operating to force the wheel into engagement with the seed-slots of the seed-dropping ring, substantially as described.

12. In a seed-planter, the combination with a hopper and a base therefor, of a rotary seed-dropping ring eccentrically mounted in the bottom of the hopper and provided on its periphery with seed-slots, said seed-dropping ring projecting beyond the lower rear edge of the hopper, and a toothed wheel yieldingly arranged above the upwardly-projecting portion of the seed-dropping ring and operating to engage the seed-slots to punch the seed therefrom, the ends of the teeth of said wheel being enlarged and said teeth being contracted between their outer and inner ends and tapered toward their inner sides, substantially as described.

13. In a seed-planter, the combination with a hopper and a base therefor, of a rotary seed-dropping ring eccentrically mounted in the bottom of the hopper and provided on its periphery with seed-slots, said seed-dropping ring projecting beyond the lower rear edge of the hopper, means for ejecting the seed from the seed-slots, a rotary conical stirrer-disk arranged concentrically in the bottom of the hopper and provided with radially-projecting arms, inwardly-projecting arms fixed to the interior of the hopper beneath the arms on the stirrer-disk, said fixed arms being longitudinally grooved on their under sides, spring-blades bolted to the under sides of said fixed arms, the ends of said blades being arranged over the slotted periphery of the seed-dropping ring, and means for rotating said seed-dropping ring and the stirrer-disk in opposite directions, substantially as described.

14. In a seed-planter, the combination with a hopper and a base therefor, of a rotary seed-dropping ring eccentrically mounted in the bottom of the hopper and provided on its periphery with seed-slots, said seed-dropping ring projecting beyond the lower rear edge of the hopper, means for ejecting the seed from the seed-slots, a rotary stirrer-disk arranged concentrically in the bottom of the hopper and provided with radially-projecting arms, inwardly-projecting arms fixed to the interior of the hopper beneath the arms on the stirrer-disk, spring-blades projecting rearwardly from said fixed arms and arranged over the slotted periphery of the seed-dropping ring, the forward ends of said spring-blades projecting downwardly and forwardly in advance of the arms to form a cut-off, and means for rotating the seed-dropping ring and the stirrer-disk in opposite directions, substantially as described.

15. In a seed-planter, the combination with a hopper and an eccentric base therefor having two centers for rotative parts, of a rotary seed-dropping ring eccentrically mounted in the hopper on one center of the base and provided on its periphery with seed-slots, said seed-dropping ring projecting beyond the lower rear edge of the hopper, means for ejecting the seed from the seed-slots, a rotary conical stirrer-disk arranged concentrically in the bottom of the hopper on the other center of the base, said stirrer-disk being provided centrally with a hollow hub constituting an oil-receptacle, said oil-receptacle being provided with an oil-outlet for lubricating the bearings of said disk and seed-dropping ring, and means for rotating the seed-dropping ring and stirrer-disk in opposite directions, substantially as described.

16. In a seed-planter, the combination with a hopper and an eccentric base therefor having two centers for rotative parts, of a seed-dropping ring eccentrically mounted in the hopper on one center of the base and provided on its periphery with seed-slots, said seed-dropping ring projecting beyond the lower rear edge of the hopper, means for ejecting the seed from the seed-slots, a rotary conical stirrer-disk arranged concentrically in the bottom of the hopper on the other center of the base and provided on its under side with a hollow hub constituting an oil-receptacle, the hollow hub being provided on its under side with a downwardly-projecting shaft of less diameter than said hub, said shaft being journaled in a bearing fixed beneath the bottom of the hopper, the said oil-receptacle being provided with an oil-outlet for lubricating the bearings of the seed-dropping ring and stirrer-disk, spring-blades arranged over the slotted periphery of the seed-dropping ring, and means for rotating the seed-dropping ring and the stirrer-disk in opposite directions, substantially as described.

17. In a seed-planter, the combination with a planter-frame, of a tilting hopper pivotally mounted on said frame, a ground-wheel mounted in the forward part of the frame, a beveled gear mounted on the frame, mechanism for driving said beveled gear from the ground-wheel, rotary seed-dropping mechanism arranged in the bottom of the hopper, gearing for rotating said dropping mechanism, and a beveled gear-wheel normally meshing with the first-named beveled gear-wheel for driving the seed-dropping mechanism when the planter is moved forward, said beveled gear-wheels being automatically thrown out of operation by the tilting movement of the hopper when the planter is moved rearwardly, substantially as described.

18. In a seed-planter, the combination with a planter-frame, of a tilting hopper pivotally mounted at its lower end on said frame, a ground-wheel arranged in the forward part of the frame, a beveled gear-wheel mounted on the frame, mechanism for driving said beveled gear-weeel from the ground-wheel, rotary seed-dropping mechanism arranged in the hopper, gearing for rotating the seed-dropping mechanism, a beveled gear-wheel meshing with the first-named beveled gear-wheel for driving the seed-dropping mechanism, means for tilting the hopper rearwardly to throw said beveled gear-wheel into engagement when the planter is moved forward, and a stop limiting the rearwardly-tilting movement of the hopper, the said beveled gear-wheels being automatically thrown out of operation by the forward tilting movement of the hopper when the planter is moved rearwardly, substantially as described.

19. In a seed-planter, the combination with a planter-frame, of a tilting hopper pivotally mounted at its lower end on said frame, a ground-wheel mounted in the forward part of the frame, a beveled gear mounted on the frame, mechanism for driving said beveled gear from the ground-wheel, rotary seed-dropping mechanism arranged in the hopper, gearing for rotating said dropping mechanism, a beveled gear-wheel meshing with the first-named bevel gear-wheel for driving the seed-dropping mechanism when the planter is moved forward, a coiled spring arranged to tilt the hopper rearwardly and hold said beveled gear-wheels in engagement when the planter is moved forward, and a horn projecting from the lower forward portion of the hopper and arranged to engage a fixed part of the frame to prevent said gear-wheel from being moved out of engagement in an upward direction, substantially as described.

20. In a seed-planter, the combination with a planter-frame, of a tilting hopper pivotally mounted on said frame, a ground-wheel mounted in the forward part of the frame, a beveled gear mounted on the frame, mechanism for driving said beveled gear from the ground-wheel, rotary seed-dropping mechanism arranged in the hopper, gearing for rotating said seed-dropping mechanism, a beveled gear-wheel normally meshing with the first-named beveled gear-wheel for driving the seed-dropping mechanism when the planter is moved forward, the said beveled gear-wheels being automatically thrown out of operation by the tilting movement of the hopper when the planter is moved rearwardly, and means for locking the hopper in its forwardly-tilted position to hold the said beveled gear-wheels out of engagement, substantially as described.

21. In a seed-planter, the combination with a planter-frame, of a tilting hopper pivotally mounted on said frame, a ground-wheel mounted in the forward part of the frame, a beveled gear mounted on the frame, mechanism for driving said beveled gear from the ground-wheel, rotary seed-dropping mechanism arranged in the hopper, gearing for rotating said seed-dropping mechanism, a beveled gear-wheel normally meshing with the first-named beveled gear-wheel for driving the seed-dropping mechanism when the planter is moved forward, said beveled gear-wheels being automatically thrown out of operation by the tilting movement of the hopper when the planter is moved rearwardly, a lever pivoted at its forward end to the hopper and provided with a recess on its under edge, a guide through which said lever loosely passes, and a rack-pin adapted to engage the recess on the under side of the arm and hold the hopper in its forward tilted position to lock the beveled gear-wheels out of engagement with one another, substantially as described.

22. In a seed-planter, the combination with a hopper and a base therefor, of a rotary seed-dropping ring eccentrically mounted in the bottom of the hopper and provided with peripheral seed-slots, said seed-dropping ring projecting beyond the lower rear edge of the hopper, means for ejecting the seed from the seed-slots and spring-blades longitudinally slitted and yieldingly bearing at their free ends on the upper side of the slotted periphery of the seed-dropping ring, substantially as described.

In testimony whereof I have hereunto set my hand in presence of two subscribing witnesses.

WILLIAM H. LEDBETTER.

Witnesses:
GEO. W. REA,
VINTON COOMBS.